Feb. 4, 1941.  G. B. BROWN  2,230,880
APPARATUS FOR MAKING AN ASBESTOS PRODUCT
Filed Jan. 25, 1938
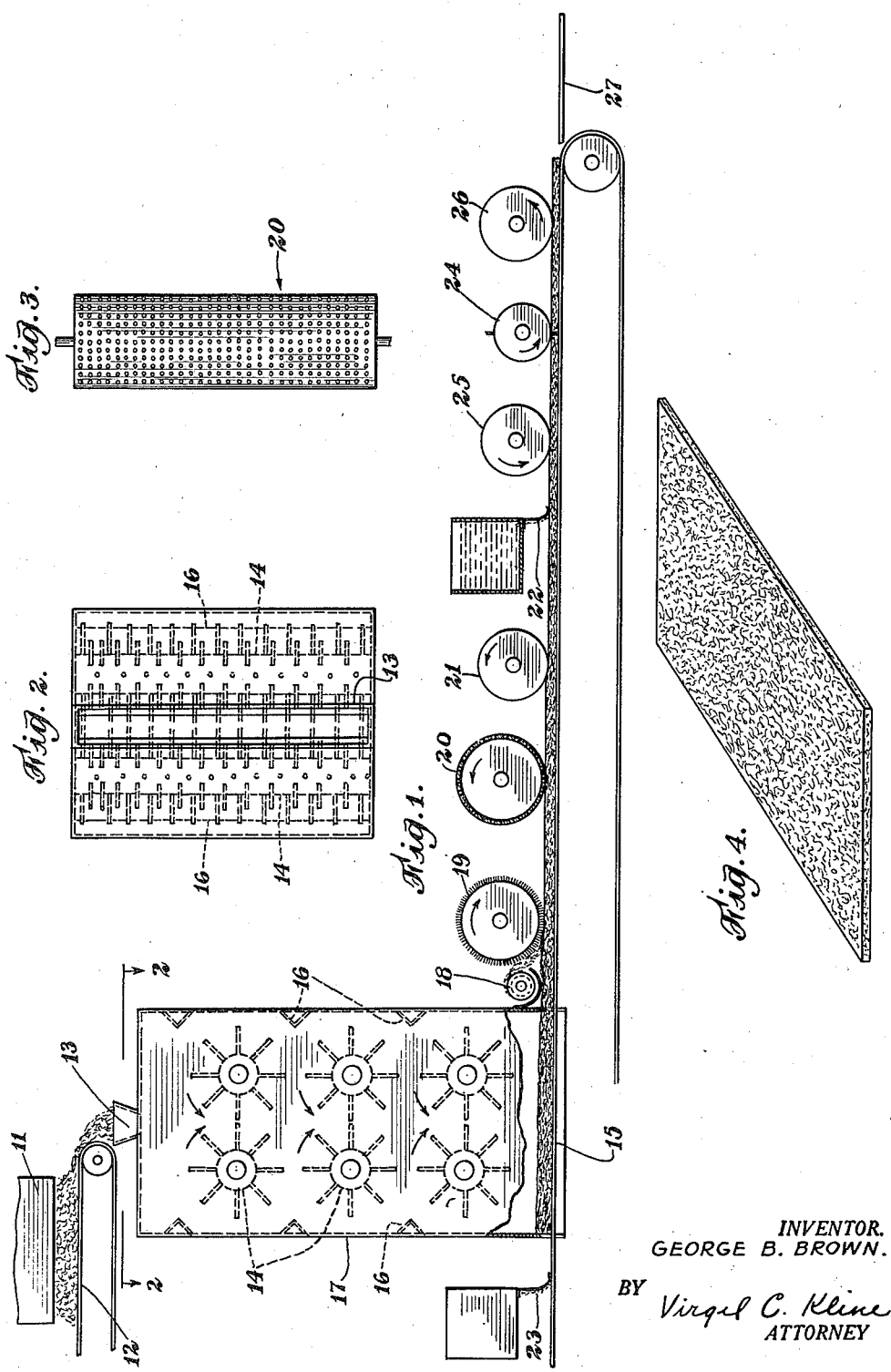
INVENTOR.
GEORGE B. BROWN.
BY Virgil C. Kline
ATTORNEY Patented Feb. 4, 1941

2,230,880

UNITED STATES PATENT OFFICE 2,230,880

APPARATUS FOR MAKING AN ASBESTOS PRODUCT

George B. Brown, Manville, N. J., assignor to Johns-Manville Corporation, New York, N. Y., a corporation of New York Application January 25, 1938, Serial No. 186,793

2 Claims. (Cl. 25—1)

This invention relates to an apparatus for making an asbestos and cement product.

More particularly, the invention relates to sheets consisting largely of asbestos and Portland cement, as, for example, in the form of shingles or siding units. The invention will be illustrated, therefore, by detailed description in connection with such sheets.

It is an object of the invention to provide an asbestos and cement sheet that, for a given modulus of rupture, may be made thinner and, therefore, less expensive of materials than such a sheet made by conventional methods. Another object is to decrease the permeability of asbestos and cement sheets to water. An additional object is the provision of an improved apparatus for the manufacture of asbestos and cement products. Other objects and advantages will appear from the detailed description that follows.

A preferred embodiment of the invention will be described in connection with the attached drawing, to which reference is made.

Fig. 1 shows diagrammatically a side elevation of an apparatus that may be utilized with my method, in making the product of the invention.

Fig. 2 shows diagrammatically a plan view of the apparatus of Fig. 1, in the direction of the arrows of line 2—2 of Fig. 1.

Fig. 3 shows a face view of the air-separating member to be described later.

Fig. 4 shows a perspective view of the finished asbestos and cement product.

The asbestos fibres and Portland cement are used in the proportions and the asbestos fibres are of quality and fibre length that are conventional in the manufacture of asbestos and cement sheets for any given purpose. Thus, in the manufacture of shingles or siding units, there may be used relatively short chrysotile fibres, as for example, Canadian fibres showing practically nothing on 4-mesh, 7 to 9 parts on 10-mesh, and 9 to 7 parts through the 10-mesh screen, when a 16-ounce sample is subjected to test by the Quebec standard, wet screening method.

The proportions of asbestos and cement may be varied within a considerable range, say 35 to 150% of asbestos on the weight of the Portland cement. In the detailed examples given below the cement and asbestos were used in approximately equal proportions by weight.

In addition to the asbestos and cement, there may be used pigments as desired and various conventional admixtures. Curing is effected in usual manner.

In general, raw materials in selected proportions are dispersed in air and are driven towards and deposited upon a felting member. There is thus formed on the felting member a layer of such thickness as to give, after the subsequent steps in the process, a finished sheet of desired caliper. The layer is then approximately levelled. Water is applied. Preferably, an air-separator is used to eliminate from the layer excess of air, that is, air which, if not removed, would later cause blistering or weakness due to its escape under conditions unfavorable to the strength of the product. Finally, the wet layer is shaped and strongly compressed and the cement therein is hardened.

This general method may be performed, for example, by delivering the selected raw materials from a storage or hopper 11 upon the moving conveyer 12, which discharges the material through opening 13 to the means for forming an intimate dispersion of the raw materials in air.

Convenient dispersing means include beaters, such as the spike rollers 14 arranged in pairs and rotated at points between any given pair of rollers, that is, at points on any roller nearest the other roller of the pair, in the direction of the felting member. In this manner, the dispersed material is driven in the direction of the felting member 15. The beaters or spike rollers may be driven at various speeds, depending in part upon the size of the beaters and the degree of packing desired on the felting member. Thus, with spike rollers of overall diameter of 7 to 11 inches, the rotation may be at the rate of about 200 to 1,000 R. P. M.

In the dispersion described, there is formed a suspension of the solid materials in a large volume of air. Other inert gaseous media may be used, as a substitute for air, in forming the aeriform suspension.

I have used to advantage three sets of the coacting beaters, arranged one set above another, so that all may coact to drive the dispersed material towards the felting member. Deflectors 16 assist in directing the dispersed material between the rollers of each pair.

The driving force of the beaters or spike rollers affect the quality of the felting on the member 15; for a certain weight of material per square foot of the layer formed on the felting member, the thickness is about 2 inches at a speed of rotation of 200 R. P. M. for 9-inch spike rollers, and only approximately 1.5 inches when the speed of rotation is increased to 1,000, other conditions being comparable.

The dispersing means are enclosed in an air-filled container or cabinet 17. The opening 13 at the top thereof for the introduction of the raw materials is preferably made relatively narrow, say about 2 inches across. This narrow opening limits the rate of entrance of air into the chamber.

In case excessive dusting is produced by the dispersing means described, the downward velocity of the air stream carrying the dispersed solid materials may be decreased by reversing the direction of rotation of one pair of the rollers, i. e. the middle pair, without affecting adversely to any great extent the degree of dispersion and intimacy of the mixture of the said materials in the air stream.

The chamber or housing 17 opens at the bottom above the felting member 16, which is suitably a moving conveyer of impermeable fabric, such as a rubber or rubberized canvas of the type that is usual as the conveyer on dry process asbestos and cement shingle machines. In its upper reach, this belt moves to the right in the arrangement shown in Fig. 1. The belt passes under the picker roller 19 of the conventional type, which levels off the top of the deposited material and throws any excess back into the screw or scroll conveyer 18 which carries the excess to the side. Because of the relatively great thickness of the air-felted material at the levelling stage, as compared to the finished thickness of the product to be described, inaccuracies of levelling are minimized in the finished, compressed sheet.

In order to obtain best results, excess of air is then separated from the layer of material, as by pressing thereagainst a member of air-permeable face, such as the rollers 20. The face of the roller is constructed of perforated metal or the like, so that air may escape at closely spaced positions, while, at the same time, the solid materials of the layer do not adhere objectionably to the surface of the roller. The weight of the roller gives sufficient pressure. Movement downward of the air-separator is limited by stops (not shown) which prevent excessive compression at this stage. Suitable openings are of 1/16 to 1/8 inch diameter.

The layer of asbestos and cement mixture is then passed under a roller 21 of continuous or solid surface, for moderate compression and further shaping.

Water is applied to the material, as at position 22, subsequent to the passage of the layer under the roller 21 and/or at position 23. Ordinarily, I apply the water at both positions 22 and 23, the water applied at 23 being placed directly upon the conveyer belt before any solid material is deposited thereupon and the water at position 22 contacting directly with the top of the layer, so that water may enter the layer from both face and back. About equal amounts of water may be applied at each position.

The water may, however, be applied to the raw materials entering through inlet 13. In this case, the amount of water used is restricted in quantity approximately equal to that required to hydrate the Portland cement during the final setting or curing thereof, so as to avoid stickiness of the dispersed material. Thus, there may be used approximately 10 to 16% of water based on the weight of the cement.

In all cases, the amount of water used is not less than that required to hydrate the Portland cement and is insufficient to cause the wet materials to flow on the conveyer under the influence of gravity alone. Ordinarily, the amount of water used is enough to form a uniformly wet, stiffly plastic mixture that flows only when subjected to great pressure.

The layer of material is then passed under a cutting roller 24, advantageously after having been first passed under a second smoothing and compressing roller 25. The cutter severs the continuous layer of shaped material into segments that may later be trimmed or cut to the exact length and breadth desired for the finished asbestos and cement sheets.

After the cutting, the segments may be passed under another smoothing roller 26.

Finally, they are removed from the conveyer and supported upon practically rigid metal plates 27, each as large or somewhat larger in area than the segments.

A number of the supporting plates 27 and segments of material thereon are stacked one above another, with the metal plates 27 alternating with the asbestos and cement sheets. The stack is then subjected to strong compression, under a hydraulic press at a pressure of approximately eight to ten thousand pounds per square inch.

If it is desired to make a sheet with a textured face, a texture plate of suitable pattern is inserted on top of each segment, before the stack is formed for the hydraulic compression.

Parts of the apparatus involved and steps in the process performed after the layer passes under the roller 21 are usual and may be varied in accordance with conventional practice, except that the water conventionally supplied at 22 is omitted in case all the water desired has been added previously, as in one modification of my process.

During the strong compression in the hydraulic press, escape of water is permitted, as at the edges of the wet sheets being compressed, and the final shaping and consolidating of the layer is effected.

After the pressure is released, the compressed sheets are allowed to stand for about a day, during which time the cement takes its initial set. The sheets are then set, as, for instance, by long standing at atmospheric temperatures, or by steam curing for a few hours in case sand or silica has been admixed, as in the alternative composition described above. The cured sheets are then separated from the metal plates and also from texture plates, if the latter have been used. Finally, the cured sheets are trimmed to size.

It has been found that sheets made in the manner described above have unusual properties.

The modulus of rupture is so increased that a sheet of thickness 0.130 inch, made with the method and apparatus described, will withstand the same load before breaking as a sheet 0.155 inch thick, otherwise comparable but made by the conventional dry shingle process and machine. In other words, for a given breaking strength, it is possible to decrease the thickness of a sheet by about a sixth, with attendant very large saving in the cost of materials.

I have found, also, a decreased rate of penetration by water in shingles made with the new method and apparatus described. In a standard test to determine the time required for the penetration of water, under a pressure corresponding to 20 inches of mercury, the time required for penetration of the water through my improved sheet is more than 50% longer than the time of penetration for a comparable sheet made by the conventional dry shingle process.

Finally, there is a decreased loss of the shaped layer of materials during the manufacturing process. This decreased loss is accounted for, in part at least, by the fact that my segments before hydraulic compression are considerably more coherent than those previously made.

In the finished asbestos and cement sheet, the asbestos fibres and cement are approximately uniformly mixed. The asbestos fibres are well dispersed, that is, individualized to a very high degree, so that there are practically no large clusters of asbestos such as are commonly found in the dry process asbestos and cement sheets. Also, the asbestos fibres are arranged at random. The fibres in my product give maximum effectiveness as reenforcing.

Another hydraulic cement, as, for example, a calcium aluminate cement (Lumnite), or a mixture of lime and comminuted diatomaceous earth may be substituted for Portland cement in the compositions described above. In case the aluminate cement is used, curing is best effected without steaming and without the addition of silica. In case a mixture of lime and diatomaceous earth is used as the cement, no additional silica is required and the curing is effected by steaming, as described.

The details given are for the purpose of illustration, not restriction, and variations within the spirit of the invention are intended to be included in the scope of the appended claims.

What I claim is:

1. An apparatus for making a fibrous and cement product which comprises a substantially air impermeable felting belt, a chamber positioned over the felting belt, and means for forming a dispersed mixture of fibres and cement in the chamber and for depositing the dispersed mixture as a layer upon the felting belt, said dispersing and depositing means including co-acting beaters positioned in the chamber over the felting belt and arranged in pairs and rotated so as to drive the dispersed mixture in the direction of said felting belt.

2. An apparatus for making a fibrous and cement product which comprises a substantially air impermeable felting belt, an air filled chamber positioned over and confining the air over the felting belt, and means for forming a dispersed mixture of fibres and cement in the air of the chamber and for depositing the dispersed mixture as a layer upon the felting belt, said dispersing and depositing means including co-acting beaters positioned in the air filled chamber over the felting belt and arranged in pairs and rotated, at points nearest to each other, in the direction of the felting belt so as to drive the dispersed mixture in the direction of said felting belt.

GEORGE B. BROWN.